US009191341B2

(12) United States Patent
Mangione-Smith (10) Patent No.: US 9,191,341 B2
(45) Date of Patent: *Nov. 17, 2015

(54) PACKET ROUTING WITHIN AN ON-CHIP NETWORK (71) Applicant: Empire Technology Development LLC, Wilmington, DE (US)

(72) Inventor: William H. Mangione-Smith, Kirkland, WA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 14 days.

This patent is subject to a terminal disclaimer.

(21) Appl. No.: 14/021,940

(22) Filed: Sep. 9, 2013

(65) Prior Publication Data

US 2014/0023073 A1 Jan. 23, 2014

Related U.S. Application Data (63) Continuation of application No. 12/648,124, filed on Dec. 28, 2009, now Pat. No. 8,559,307.

(51) Int. Cl.
*H04L 12/911* (2013.01)
*G06F 15/78* (2006.01)
(52) U.S. Cl.
CPC .......... *H04L 47/823* (2013.01); *G06F 15/7825* (2013.01)
(58) Field of Classification Search
CPC ........................ H04L 47/823; G06F 15/7825
See application file for complete search history.

(56) References Cited

U.S. PATENT DOCUMENTS

| 7,644,254 | B2 | 1/2010 | Darrington et al. |
| 7,743,257 | B2 | 6/2010 | Rabeler |
| 7,843,929 | B2 | 11/2010 | Scott et al. |
| 7,864,757 | B2 | 1/2011 | Hall et al. |
| 7,969,880 | B2* | 6/2011 | Yano et al. ................. 370/230.1 |
| 8,612,711 | B1* | 12/2013 | Griffin .......................... 711/165 |
| 2002/0041409 | A1* | 4/2002 | Laham et al. ................ 359/110 |
| 2005/0128949 | A1* | 6/2005 | Ku et al. ....................... 370/235 |
| 2008/0263386 | A1 | 10/2008 | Darrington et al. |

(Continued)

FOREIGN PATENT DOCUMENTS

| JP | 2005-277915 A | 10/2005 |
| JP | 2008-294586 A1 | 12/2008 |
| JP | 2010-525433 A | 7/2010 |

OTHER PUBLICATIONS

"Packetization and routing analysis of on-chip multiprocessor networks", Terry Tao Ye, Journal of Systems Architecture, 50 (2004), 81-104.

(Continued)

*Primary Examiner* — Marsha D Banks Harold
*Assistant Examiner* — Anthony Luo
(74) *Attorney, Agent, or Firm* — Maschoff Brennan (57) ABSTRACT

Techniques for packet routing in an on-chip network are provided. In one embodiment, a method for routing packets in a multi-core processor including multiple cores connected by an on-chip network includes identifying ports that are incorrect while routing the packet. After receiving the packet at an input port, some of the ports are excluded from consideration while selecting the output port for the packet. The output port is selected from the remaining ports and the packet is routed to the selected output port.

18 Claims, 6 Drawing Sheets

(56) References Cited

U.S. PATENT DOCUMENTS

2009/0119619 A1* 5/2009 Bailey et al. ................. 715/822
2010/0202449 A1 8/2010 Moscibroda et al.
2010/0238938 A1 9/2010 Zhou et al.
2011/0023047 A1* 1/2011 Memik et al. ................. 718/104

OTHER PUBLICATIONS

Hiroki Matsutani, et al. "Prediction Router: Yet Another Low Latency On-Chip Router Architecture" [Online: http://www.hal.rcast.u-tokyo.ac.jp/-matutani/papers/matsutani_hpca2009.pdf] 2009.
Matsutant, H, et al., "Evalutions of Prediction Router for Low-Latency On-Chip Networks", The Institute of Electronics, Information and Communication Engineers, Technical Report of IEICE, pp. 1-6 (2009).
Luca Benini, et al "Networks on Chips: Technology and Tools" book, 1967, pp. 2-8, 253-257 and 356-360, The Morgan Series in systems on silicon, Elsevier Inc, U.S.
Dong Kook Park, et al Design of a Dynamic Priority-Based Fast Path Architecture for On-Chip Interconnects. Proceedings of the IEEE Symposium on High-Performance Interconnects (HOTI'07), pp. 15-20, Aug. 2007.
L. Bennini, et al Networks on Chips: a New SoC Paradigm. IEEE Computer, 35(1): 70-78, Jan. 2002. [Online: www.tilera.com/products/Tile64/php].
William James Dally, et al "Principles and Practices of Interconnection Networks" Book, Morgan Kaufmann, 2004, pp. 2-8 and 390-397.
Jongman Kim, et al A Gracefully Degrading and Energy-Efficient Modular Router Architecture for On-Chip Networks. Proceedings of the International Symposium on Computer Architecture (ISCA'06), pp. 14-15, Jun. 2006.
Gokhan Memik, et al "Just Say No: Benefits of Early Cache Miss Determination" HPCA 2003 [Online: http://citeseerx.ist.psu.edu/viewdoc/download;jsessionid=204C55E66F552EC127601CA1423E08C6?doi=10.1.1.12.2674&rep=rep1&type=url&i=0].
Tsutomu Yoshinaga, et al "Impact of Predictive Switching in 2-D Torus Networks," International workshop on innovative architecture for future generation high-performance processors and systems, 2007, vol. 11, Iss, 13, pp. 11-19.

\* cited by examiner

PACKET ROUTING WITHIN AN ON-CHIP NETWORK

CROSS-REFERENCE TO RELATED APPLICATION

This application is a continuation under 35 U.S.C. § 120 of U.S. patent application Ser. No. 12/648,124, filed Dec. 28, 2009, now U.S. Pat. No. 8,559,307, which is incorporated herein by reference.

BACKGROUND

In the computing industry, advances in processor technology are continually being achieved. These advances in technology are often expressed in different ways. Clock speed, for example, has often been an indicator of performance. Higher clock speeds contribute to better performance.

Currently, the performance of a processor is often expressed not only in terms of clock speed, but also in terms of the number of available processor cores. For instance, a dual core processor typically has higher performance than a single core processor, even when operating at slower clock speeds.

In the initial development of multi-core processors, the cores (and other components) were connected using conventional bus technology. As the number of cores in a processor increases, however, this approach becomes infeasible and can actually adversely impact the performance of the multi-core processor. As a result, processor designers began considering the concept of an on-chip network. An on-chip network would allow data or packets to be routed more quickly than conventional bus technologies.

Notwithstanding the development of on-chip networks, the performance of a multi-core processor has substantial room for improvement. For example, the routing time of a packet in a conventional multi-core processor depends at least on how many hops the packet is required to make and how long it takes to route the packet at each core. The ability to provide high throughput and low latency routing in an on-chip network is becoming increasingly important, particularly in view of the trends of virtualization, increasing core size, and increasing core number.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments described herein relate to routing packets in an on-chip network of a multi-core processor. Cores and network switches in the multi-core processor typically include multiple ports. As a result, routing packets being transmitted in the on-chip network to the correct port quickly can improve the performance of the multi-core processor. For example, multi-core processors that spend less time deciding where to route packets are likely to be more efficient than multi-core processors that spend more clock cycles determining how to route the packets.

Routing packets in the multi-core processor, as disclosed herein, involves the selection of an output port for the packets. The selection or identification of the output port actively excludes some of the ports from consideration when routing the packets. Reducing the number of packets makes it easier to identify the correct output port. The ports excluded from consideration are incorrect output ports.

The exclusion of some ports can be combined, in some instances, with predicting the correct output port to quickly route the packets. By predicting the output port from a reduced set of ports, the likelihood of selecting the correct port increases and the selection of the port can be achieved in as little as a single clock cycle.

Figure 1:
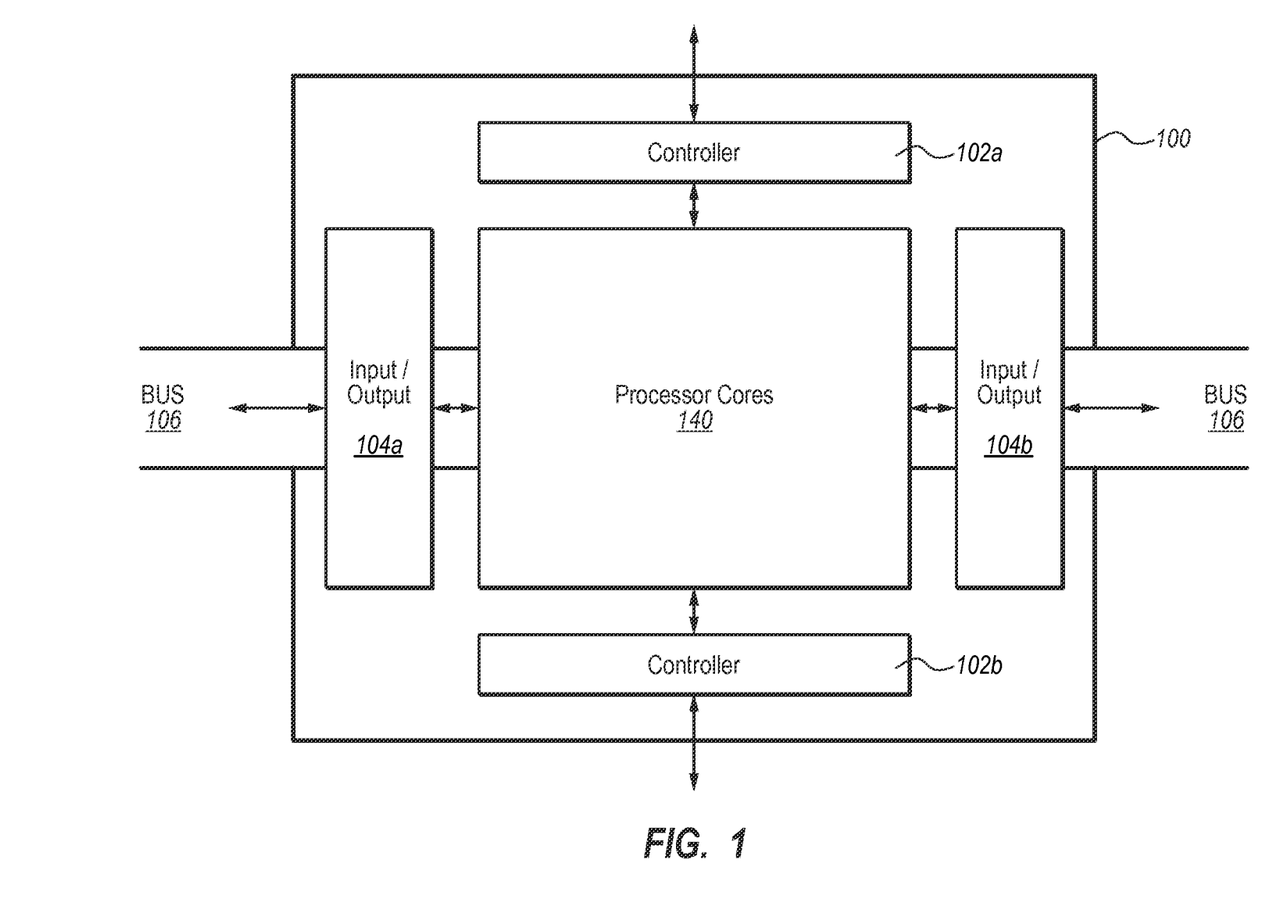
FIG. 1 shows an illustrative embodiment of a block diagram of a multi-core processor that includes multiple processor cores.

FIG. 1 shows an illustrative embodiment of a block diagram of a multi-core processor 100 that includes multiple processor cores 140 and may be included in a computer or other computing device. The multi-core processor 100 can be used in computers and other devices for processing purposes. The multi-core processor 100 may be responsible for operating or executing software or other executable instructions that have been loaded, stored, or otherwise made accessible to the computer. As described in more detail herein, the multi-core processor 100 may route data internally by excluding certain ports from consideration while routing the data.

The multi-core processor 100 includes the processor cores 140. The processor cores 140 execute instructions, perform calculations, and otherwise provide the computing and processing capability in a computer or computer system. The processor cores 140 can communicate with other modules or components in the computer via input/output modules 104*a* and 104*b*. The input/output modules 104*a* and 104*b* can receive/transmit data that is often carried over a system bus 106.

The input/output modules 104*a* and 104*b* can be configured or are capable of operating in accordance with multiple protocols including, but not limited to, Gigabit Ethernet, XAUI, PCIe, JTAG, TWI, or the like. The input/output modules 104*a* and 104*b* may also perform serializing/deserializing of data as necessary. The input/output modules 104a and 104b may include separate modules, which may be configurable, for each protocol. The input/output modules 104a and 104b may enable the multi-core processor 100 or the computer to communicate with other computers over networks such as a local area network, the Internet, or the like. For example, a server computer having the multi-core processor 100 may communicate with a client computer over a network. In the preceding example, the client computer may or may not have the multi-core processor 100.

The multi-core processor 100 also includes controllers 102a and 102b. The controllers 102a and 102b, which may include multiple controllers, may provide the processor cores 140 with access to system memory such as various cache levels, RAM, or the like or any combination thereof. One of skill in the art can appreciate that the multi-core processor 100 may include other modules (e.g., instruction decoders, bus interface unit, address generator, floating point units, integer execution units, registers, etc.). Further, the multi-core processor 100 may be integrated into a single chip. Alternatively, some of the modules described herein may be in separate chips that interact with each other.

Figure 2:
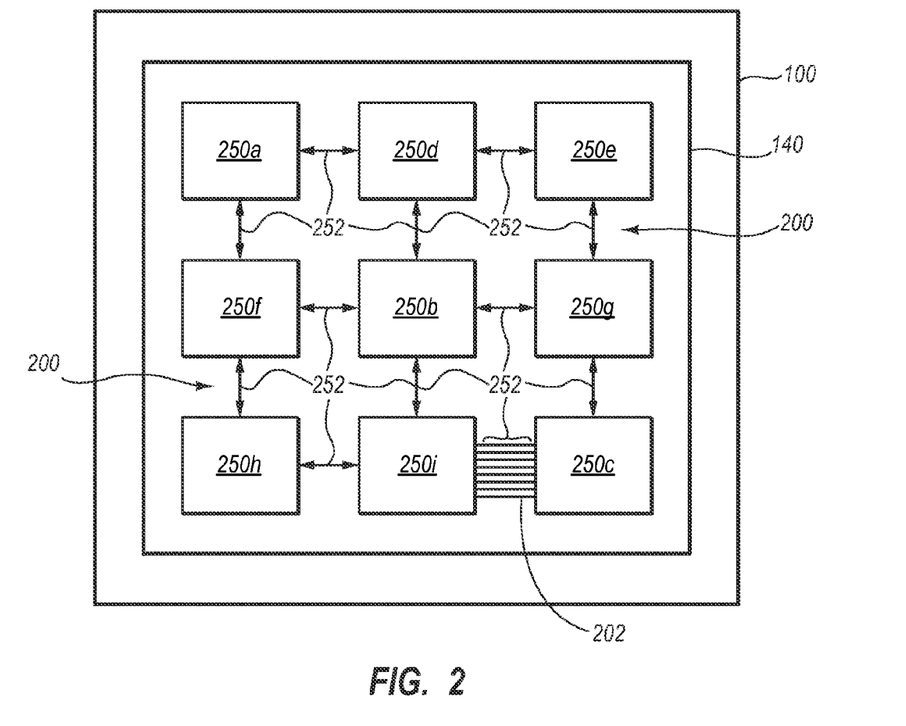
FIG. 2 shows a block diagram illustrating one example of an on-chip network that connects at least the processor cores of the multi-core processor.

FIG. 2 shows a block diagram illustrating one example of an on-chip network 200 that connects at least the processor cores 140 of the multi-core processor 100. FIG. 2 provides a more detailed view of the processor cores 140 in the multi-core processor 100. The processor cores 140 include multiple individual cores 250, which include a core 250a, a core 250b, and a core 250c, as well as cores 250d-250i. Depending on context, reference to or description of the core 250 is applicable to each of the cores 250a, 250b, and 250c. Similarly, any reference to or description of the cores 250a, 250b, and 250c may also be equally applicable to the other cores 250 in accordance with context.

Each core 250 is generally the same, although there may be instances where some of the cores 250 differ structurally from other cores. For example, some of the cores 250 may interface with the input/output modules directly while some of the cores may communicate with the input/output modules through other cores. The core 250a, which is included in the cores 250, may communicate with modules or components of the multi-core processor 100 through the cores 250.

The cores 250 can be arranged in different configurations or topologies. Mesh topologies, grid topologies, torus topologies, or fat tree topologies are examples of core topologies that may each be connected as described herein.

Each core 250 includes a processor that can function independently of other cores in the processor cores 140. Each core 250 can typically execute computer program on its own if necessary. One advantage of the multi-core processor 100 is that the cores 250 can work collectively (e.g., in parallel) to perform an application or execute instructions, etc.

When collectively executing an application, the cores 250 may have different responsibilities within the application being executed. As a result, the multi-core processor 100 is able to execute an application more quickly than when processing the same application with a single core or compared to a single-core processor. In addition, the cores 250 can operate on different applications or processes in a computing system at the same time. This allows, for example, some of the cores 250 to perform one application, while other cores 250 perform or execute other applications or processes. In addition, the cores 250 can also switch between application processes.

When performing a process or application in the multi-core processor 100, there may be a need for data (e.g., application data, addresses, instructions, etc.) to be transferred from one of the cores 250 to another of the cores 250 (e.g., from the core 250b to the core 250c). This may often be achieved using the on-chip network 200, which includes the connections 252.

In FIG. 2, the connections 252 are used to connect the cores 250 to each other. While all of the cores 250 may not be directly connected to each other (e.g., the core 250b is not directly connected to the core 250a), the connections 252 ensure that any of the cores 250 can communicate with any other of the cores 250 directly or via one or more other cores. For example, when the cores 250 are arranged in a grid configuration, the cores 250 may have connections 252 in up, right, left, and down directions. In this example, each connection 252 may include multiple channels 202. The channels may include the physical connections between the cores 250. As a result, multiple channels may exist between directly connected cores 250.

Figure 3:
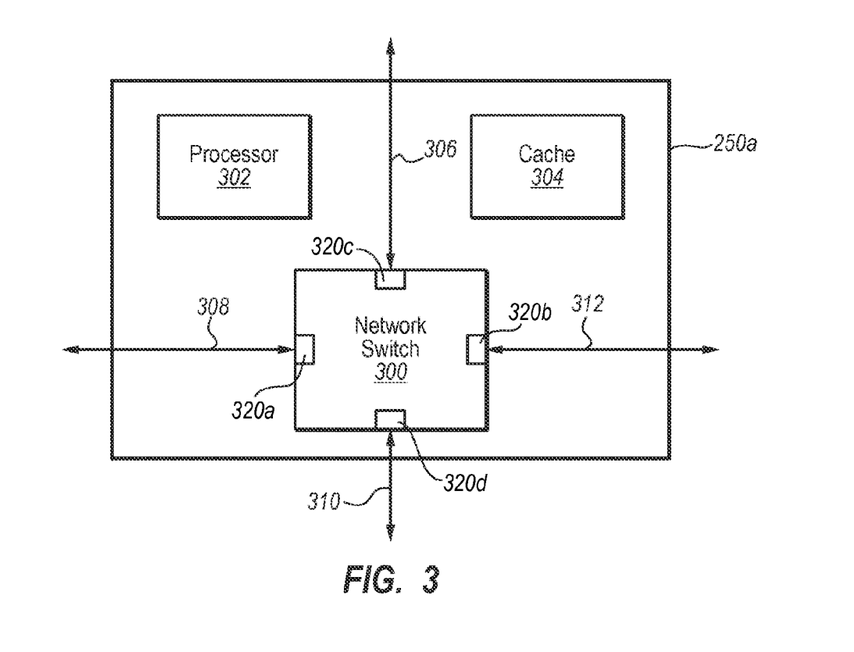
FIG. 3 shows a block diagram illustrating one example of a core included in the multi-core processor.

FIG. 3 shows a block diagram illustrating one example of the core 250a included in the multi-core processor 100. The core 250a includes a processor 302, a cache 304, and a network switch 300. The ability to deliver or transfer data using the connections 252 is achieved by providing each of the cores 250 with the network switch 300. The network switch 300 may be connected to adjacent network switches in other cores with a connection 306, a connection 308, a connection 310, and a connection 312, which are examples of the connections 252. As previously described, each of the connections 252, 312, 306, 308, and 310 generally includes multiple channels. As a result, the core 250a is able to communicate with adjacent or directly connected cores 250 via multiple channels.

The network switch 300 interfaces with the connections 306, 308, 310, and 312 through ports 320 (illustrated as ports 320a-320d in FIG. 3). More specifically, the channels represented by each of the connections 312, 306, 308, and 310 are connected to specific ports included in the ports 320. In one example, the ports 320 of the network switch 300 include on the order of 10 ports, 20 ports, or more ports. In this example, the core 250a may communicate with at least four other cores.

Each connection may include, by way of example only, five ports that correspond to five channels. One of skill in the art can appreciate that each connection may include more channels or fewer channels with corresponding ports. In this example, each of the five channels provides a physical connection to each port. In addition, the network switch 300 may have channels with the processor 302.

The core 250a also includes the cache 304. The cache 304 may be specific to the core 250a or may be shared with other cores 250. Alternatively, the cache 304 may be included in the network switch 300 or accessible to the network switch 300.

Figure 4:
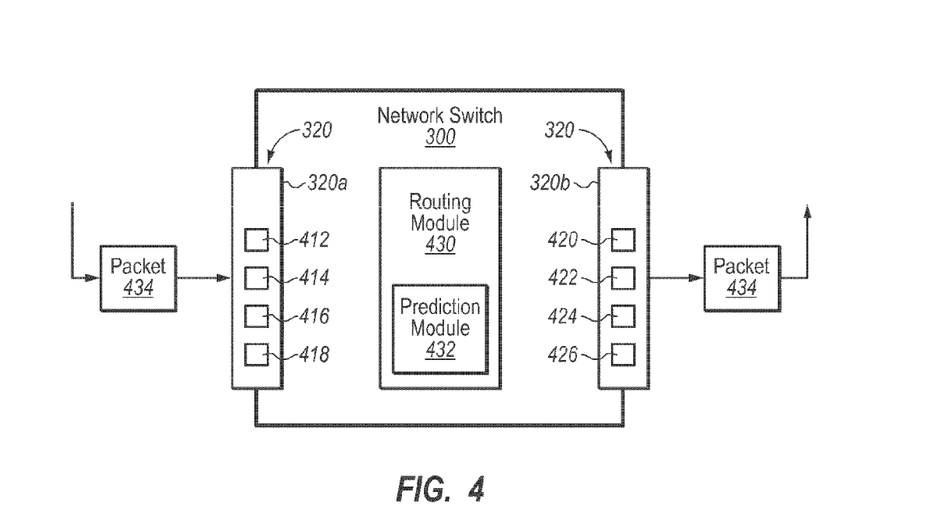
FIG. 4 shows an example of a network switch included in each of the cores in the multi-core processor suitable to route a packet being transmitted in the on-chip network.

FIG. 4 shows an example of the network switch 300 included in each of the cores 250 in the multi-core processor 100 suitable to route a packet being transmitted in the on-chip network. The network switch 300 includes the ports 320, which are illustrated in FIG. 4 as ports 320a and ports 320b (the ports 320c and 320d of FIG. 3, among other ports, are not expressly depicted in FIG. 4. However, in some embodiments, one or more of these ports may be also present in the network switch 300 of FIG. 4). For simplicity, the ports 320 in FIG. 4 are illustrated conceptually as input ports 320a and output ports 320b. However, any of the ports 320 can be an input port and any of the ports 320 can be an output port for the network switch 300.

More specifically, FIG. 4 illustrates that the ports 320 include individual ports 412, 414, 416, 418, 420, 422, 424, and 426. When data is received at one of the ports 320, the rest of the ports constitute potential output ports. One of skill in the art can appreciate, as previously described, that the network switch 300 can have any desired number of ports.

When data, represented by a packet 434, is received/transmitted by the network switch 300, any of the ports 320 can be an input port for the packet 434 and any of the ports 320 can be an output port for the packet 434 as previously described. The packet 434, by way of example only, may represent a single packet, multiple packets, streaming data (e.g., audio, video), instructions, addresses, or other data or the like or any combination thereof that may be transmitted or communicated over the on-chip network 200 between cores 250.

The packet 434 thus represents the data transmitted in the on-chip network 200. By way of example, the packet 434 may arrive at the port 412, which thus becomes the input port for the packet 434. A routing module 430, which may include a controller for the network switch 300, then routes the packet 434 to the port 420 (the output port), unless the packet 434 has reached the destination core for further processing. More specifically, the routing module 430 selects the port 420 as the output port and then routes the packet 434 accordingly.

FIG. 4 illustrates that the routing module 430 includes a prediction module 432 that is used to select the output port for the packet 434. By selecting the output port for the packet 434, the time required to select the output port can be reduced. For example, the time required to select the output port can be fewer than four clock cycles, two or fewer clock cycles, or to a single clock cycle.

In some examples, selecting the output port may include predicting the output port or partially predicting the output port. Although transmitting the packet 434 may require additional clock cycles, the selection of the output port only requires a single clock cycle in one embodiment, although other embodiments may use more than one clock cycle.

The prediction module 432 selects the output port for the packet 434. More specifically, the prediction module 432 is used by the routing module 430 to determine which of the ports 320 is the output port from which the packet 434 should be sent once it arrives on the input port.

Figure 5:
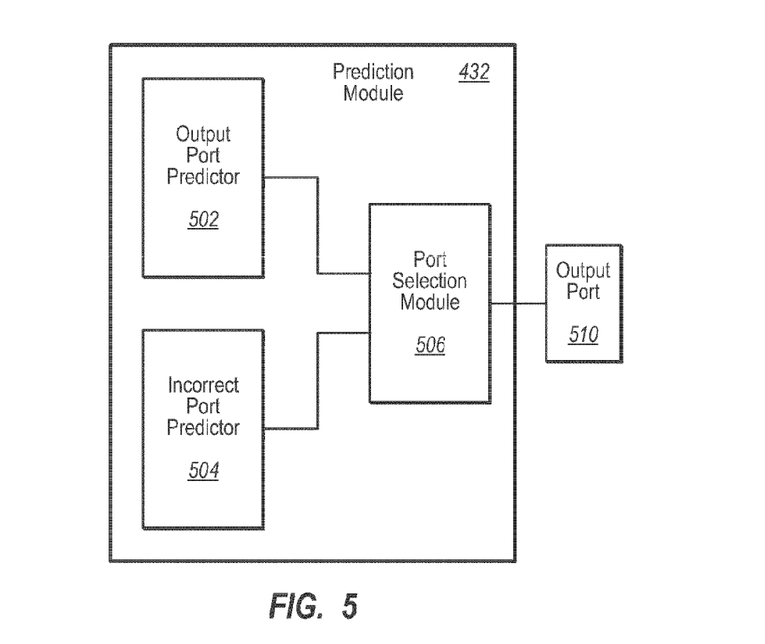
FIG. 5 shows an example prediction module that selects an output port for the packet.

FIG. 5 shows an example of the prediction module 432 that selects an output port 510 for the packet 434. The prediction module 432 includes an output port predictor 502, an incorrect port predictor 504, and a port selection module 506. Using information provided by the output port predictor 502 and the incorrect port predictor 504, the port selection module 506 selects an output port 510 (which is one of the ports 320 in this example) for the packet 434.

For example, with reference to FIGS. 4 and 5, the packet 434 may arrive at the port 412, which is the input port in this instance. The prediction module 432 predicts that the output port 510 is the port 420, for example. The routing module 430 then routes the packet 434 to the port 420, which is the output port in this example.

In the event that the output port selected by the prediction module 432 is wrong, a kill signal may be sent to kill transmission of the packet 434 and the packet 434 is then directed or routed to a different output port selected from among the ports 320. The selected output port may be wrong in part because the output port may be selected using predictive algorithms. When the predicted output port is the correct output port, the transfer delay of the packet 434 is reduced and performance improved. When the predicted output port is the incorrect output port, the kill signal ensures that the packet 434 is not propagated incorrectly.

In this example, the prediction module 432 may also select the output port a second time. In this case, however, the port 420 is now known to be incorrect and will be excluded from consideration by the prediction module 432.

The prediction module 432 increases the likelihood that the correct output port will be selected for the packet 434. When the correct output port is selected, the performance of the multi-core processor 100 as a whole is improved—particularly when the packet 434 is required to make several hops in the on-chip network 200 in a path between an originating core (e.g., the core 250c) and a destination core (e.g., the core 250b).

The selection of the output port 510 may be achieved when, in this example, the incorrect port predictor 504 identifies which of the ports 320 are incorrect. The incorrect port predictor 504 can identify a set of the ports 320 that are incorrect, meaning that they are not the correct output ports for the packet 434. The port selection module 506 can use the output from the incorrect port predictor 504 in some embodiments and then simply select one of the remaining ports (i.e., ports not identified as incorrect ports) as the output port 510.

Typically, ports identified in the output of the incorrect port predictor 504 are almost never the correct port. In other words, it is almost a certainty that the ports identified in the output of the incorrect port predictor 504 are incorrect. In one example, the incorrect ports or set of incorrect ports are identified using Bloom filters.

A Bloom filter is a low overhead hardware structure that predicts when certain events cannot happen, although the Bloom filter may be implemented in software. In one embodiment, a Bloom filter includes a set of hash functions and a vector of some length. Usually, hash functions return a value that is within the length of the vector and entries (e.g., bits) in the vector may initially be set to 0. The vector may have a length of 50, for instance, and the hash functions return a value between 1 and 50.

Next, keys are run through all of the hash functions and the results are effectively offsets into the vector. The entries that correspond to the offsets in the vector are then set to 1. Gradually, the keys populate some of the entries in the vector with a 1.

When an unknown key is presented to a Bloom filter, it can be hashed with all of the hashes to see if the unknown key exists in the Bloom filter. If all of the hash results correspond to entries that are 0, then the key is not in the Bloom filter. If all of the hash results are 1, then the key may be in the Bloom filter. If some of the hash results are 0 and some are 1, then the key may be a false positive.

In this example, the keys may correspond to information or data that, when passed through the Bloom filters, can determine which ports are the incorrect ports. In one example, each port may be associated with a Bloom filter. Alternatively, all of the ports can be represented by a single Bloom filter.

For example, the packet or a portion thereof received at the input port may be a key that can be run through the Bloom filter. The input to the incorrect port predictor 504 may be the packet or a portion thereof and the output of the incorrect port predictor 504 identifies incorrect ports. More specifically, when the input to the incorrect port predictor 504 is hashed and the results correspond to entries in the vector that are zero, then the incorrect port can be determined with almost complete certainty.

As a further example consider the case of a packet that contains an indicia identifying it as one in a sequence of packets that follow the same route but not the first in said sequence. Such indicia are not uncommon in packet headers. If such a packet arrives and no packet from that source address has ever exited via a specific port then the bloom filter can identify that the specific port cannot be the appropriate destination. Bloom filters may be strictly combinational parallel structures that can be accessed in a single clock cycle.

In this case, the incorrect port predictor 504 may use Bloom filters to identify ports that are incorrect. While false positives may be possible in a Bloom filter, false negatives are not possible. As a result, the incorrect port predictor 504 will never identify a port as incorrect when it actually is correct.

In one embodiment, working in parallel with the incorrect port predictor 504, the output port predictor 502 may rank the ports 320 to determine which of the ports 320 is more likely to be the output port. The ports 320 can thus be ranked, for example by their probability of being the correct output port.

For example, the output port predictor 502 may predict the output port 510 using a strategy where the output port 510 is the same as the output port for the previous packet. In this case, the most recent port may be ranked higher than other ports and may have the highest probability of being the correct output port.

In another example, the prediction module 432 may maintain a history of which ports are used as output ports. The output port predictor 502 may then select the most frequently used port at the output port 510. The most frequently used port is ranked highest. The remaining ports can then be ranked based on their frequency of use. The output port 510 selected is the most frequently used port, as long as the incorrect port predictor does not exclude it.

In another example, the prediction module 432 may select the output port 510 randomly from the ports that have not been excluded by the incorrect port predictor. Additional algorithms for ranking or predicting the output port 510 are described in "Prediction Router: Yet Another Low Latency On-Chip Router Architecture", published in High Performance Computer Architecture, 2009. HPCA 2009. IEEE 15$^{th}$ International Symposium on 14-18 Feb. 2009, which is incorporated herein by reference in its entirety.

The port selection module 506 receives the output of the output port predictor 502 and the output of the incorrect port predictor 504 to select an output port 510. For instance, the incorrect port predictor 504 may identify that the port 424 is incorrect and that the packet 434 is not intended for transmission to or through the port 424. As a result, the port 424 can be dropped from consideration by the port selection module 506 even if the output port predictor 502 has high confidence that the port 424 is the correct output port.

The incorrect port predictor 504 effectively reduces the number of ports that are considered by the port selection module 506 when selecting the output port 510. Because certain ports are excluded from consideration the port selection module 506 is more likely to select the correct output port 510. The performance of the network switch 300 is improved and the packet 434 can be routed quicker and more efficiently in the on-chip network 200 of the multi-core processor 100.

The incorrect port predictor 504 can identify first ports from the plurality of candidate ports of the multi-core processor 100. The output port predictor 502 can identify second ports from the plurality of ports without regard to the first ports in one example. Thus, the second ports may or may not include some of the first ports. When the second ports identified by the output port predictor 502 include at least some of the first ports, the selection module 506 can exclude them before or while selecting the output port 510.

The following example illustrates how the incorrect port predictor 504 may identify the incorrect ports among the ports 320. In this example, the multi-core processor 100 may use or establish virtual circuits (a path among the cores 250 from the originating core to the destination core) to route packets in the on-chip network of the multi-core processor 100. The core 250a, for instance, may be included in such a virtual circuit. In fact, the core 250a may be included in multiple virtual circuits that may involve many originating cores and many destination cores.

In the case where the core 250a is included in multiple virtual circuits, the prediction module 432 and in particular the incorrect port predictor 504 can identify that certain ports are to be excluded from consideration when selecting the output port for the packet 434. The core 250a (or a module thereof such as the incorrect port predictor 504) can determine that none of the virtual circuits that include traversal of the core 250a use the port 420. As a result, the output of the incorrect port predictor 504 indicates that the port 420 can be excluded from consideration when the port selection module 506 selects the output port 510. In other words, the incorrect port predictor 504 can identify incorrect output ports that are incorrect with certainty in some embodiments. Thus, the incorrect output ports can be determined with almost complete certainty.

Bloom filters can typically be implemented using a combination of parallel random access memory structures, programmable registers, and combinational logic. A wide range of design choices exist based on the needs for identifying the largest possible set of incorrect ports versus the cost of implementing large hardware structures.

Figure 6:
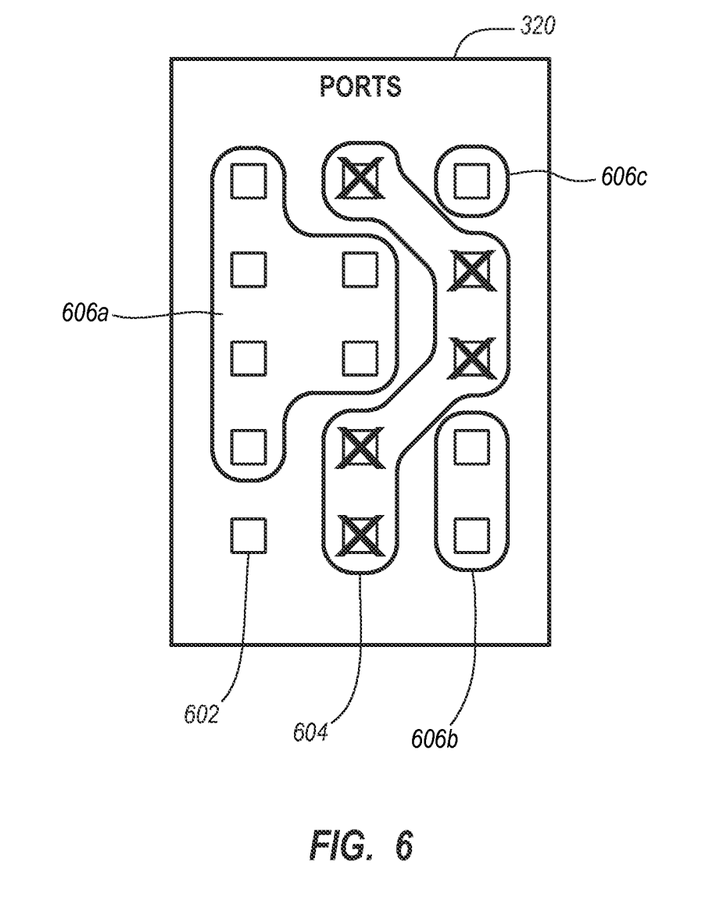
FIG. 6 shows examples of ports that are excluded from consideration when selecting the output port for the packet.

FIG. 6 shows examples of ports that are excluded from consideration when selecting the output port 510 for the packet 434. By way of example, as depicted in FIG. 6, the packet 434 may have been received by an input port 602. Moreover, the incorrect port predictor 504 may have determined that a set of ports 604 are to be excluded from consideration when the output port is selected. The output port predictor 502 can rank sets of ports 606 (illustrated as a set of ports 606a, a set of ports 606b, and a set of ports 606c in FIG. 6) according to probability. The output port predictor 502 may rank all of the ports in the sets 604 and 606 as well, but any ports that are determined to be incorrect ports will be excluded from consideration as the output port 510. With this information, the port selection module 506 can select the output port 510 from among the sets of ports 606.

Figure 7:
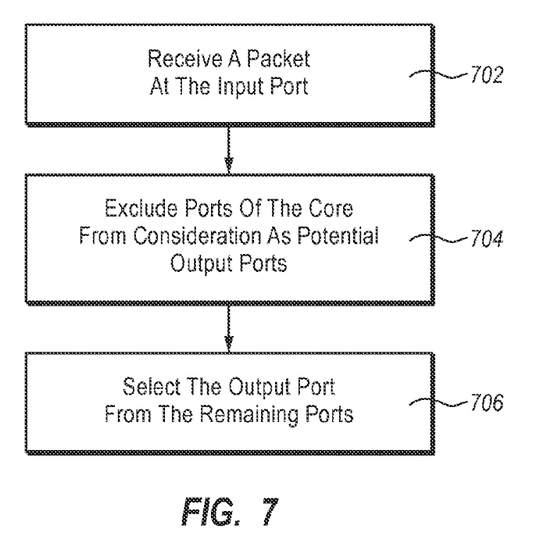
FIG. 7 shows a flow diagram of an illustrative embodiment of a method for routing the packet in the on-chip network.

FIG. 7 shows a flow diagram of an illustrative embodiment of a method for routing the packet in the on-chip network. Beginning in block 702, a packet is received at the input port of one of the cores connected in the on-chip network. As previously indicated, each core of the multi-core processor typically includes multiple ports and the input port can be any of these ports. The goal of the core and in particular of the network switch included in the core is to select the output port as quickly as possible and then route the packet to the selected output port.

In block 704, the core at which the packet is received excludes some of the ports from consideration as the output port for the packet. In some embodiments, the incorrect port predictor 504 may identify the ports to exclude from consideration as the output port as described above. Excluding some of the ports from consideration can include identifying ports that are incorrect. In other words, those ports that are definitely not the appropriate output port are identified as incorrect. In one example, the incorrect ports that are identified as incorrect are determined using Bloom filters or other knowledge stored by the corresponding core. In some instances, the identification of the incorrect ports can be with 100 percent certainty. Alternatively, other filters with less certainty may be used to identify the incorrect ports.

In block 706, the core selects an output port from the remaining ports (i.e., the ports not excluded from consideration). In some embodiments, the port selection module 506 selects the output port as described above. Selecting the output port from the remaining ports (after excluding the incorrect ports) may include ordering the remaining ports according, for example, to each port's probability of being the output port. Once the output port is selected, the packet is routed to the selected output port. Alternatively, all of the ports can be ranked or ordered and those that are incorrect are simply ignored when selecting the output port.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
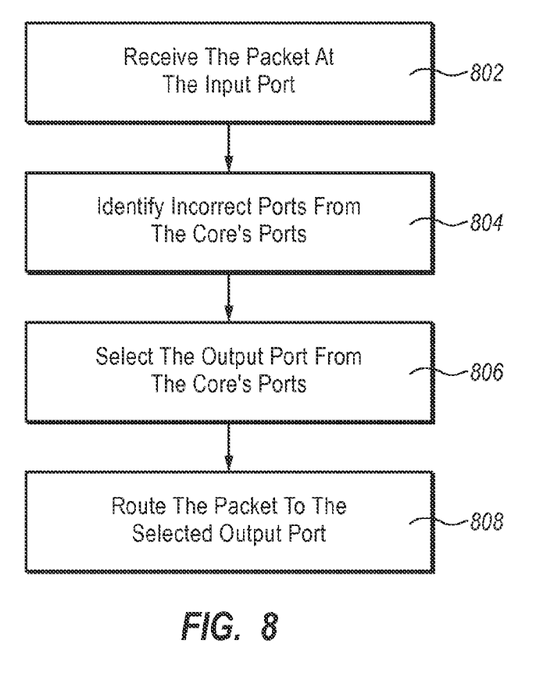
FIG. 8 shows a flow diagram of another illustrative embodiment of a method for routing the packet in the on-chip network.

FIG. 8 shows a flow diagram of an illustrative embodiment of a method for routing the packet in the on-chip network. In block 802, a packet is received at the input port of one of the cores. The input port may be unknown to the core prior to the arrival of the packet. In block 804, the core or a module of the core such as the incorrect port predictor identifies incorrect ports from the core's ports. In block 806, the core selects the output port from the core's remaining ports (i.e., those ports that were not excluded by the incorrect port predictor). In one example, selecting the output port includes excluding the incorrect ports from consideration. After the output port is selected, the packet is routed to the selected output port in block 808.

Figure 9:
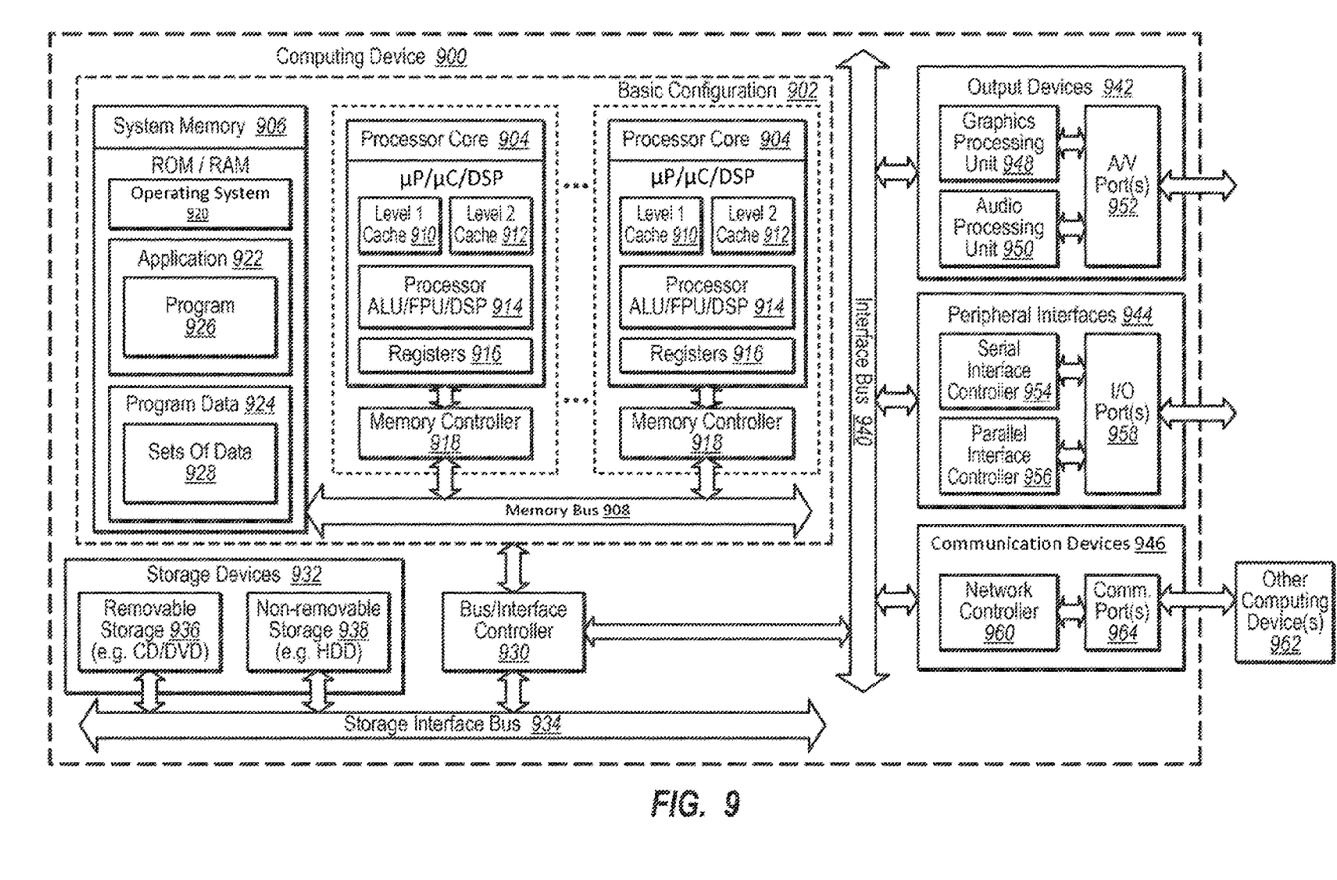
FIG. 9 shows an example computing device that includes a multi-core processor.

FIG. 9 is a block diagram illustrating an example computing device 900 that is arranged for routing packets in the on-chip network of the multi-core processor in accordance with the present disclosure. In a very basic configuration 902, computing device 900 typically includes one or more cores 904 and a system memory 906. Each of the one or more cores 904 may be an example of a core. The cores 904 are thus an example of the multi-core processor. A memory bus 908 may be used for communicating between processor 904 and system memory 906.

Depending on the desired configuration, core 904 may be of any type including but not limited to a microprocessor (μP), a microcontroller (μC), a digital signal processor (DSP), or any combination thereof. As previously stated the core 904 may represent one of the cores 250. The computing device 900 would thus be configured with multiple cores 250. The core 904 may include one more levels of caching, such as a level one cache 910 and a level two cache 912, a processor 914, and registers 916. An example core 914 may include an arithmetic logic unit (ALU), a floating point unit (FPU), a digital signal processing core (DSP Core), or any combination thereof. An example memory controller 918 may also be used with core 904, or in some implementations memory controller 918 may be an internal part of core 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924. Application 922 may include a program 926 that is configured to use one or more of the cores in the processor 904. Program data 924 may include sets of data 928 that have been processed by the cores 904 while executing the application 922 as will be further described below. In some embodiments, application 922 may be arranged to operate with program data 924 on operating system 920 such that the incorrect port predictor 504 can identify the ports that are incorrect. The program data 924 may include, for example, sets of data 928 that are summarized by or used by Bloom filters. This described basic configuration 902 is illustrated in FIG. 9 by those components within the inner dashed line.

The computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio multi-core processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A network switch, comprising:
a plurality of ports configured to:
receive a plurality of first packets;
output each of the plurality of first packets at one of a plurality of previous output ports of the plurality of ports; and
receive, at a first port of the plurality of ports and after output of the plurality of first packets, a second packet different from the first packets, wherein the second packet is received after reception of the plurality of first packets; and
a routing module coupled to the plurality of ports and configured to:
rank each of the plurality of previous output ports based on one or more of: a frequency of use of the previous output ports as output ports and how recently the previous output ports were used as output ports;

determine a first set of ports of the plurality of ports as incorrect output ports for the second packet based on one or more of: each of the first set of ports being an incorrect output port for one or more of the plurality of first packets and application of a Bloom filter to the plurality of ports;

exclude the first set of ports from the plurality of ports to determine a second set of ports that includes the plurality of previous output ports;

predict, from the second set of ports, a second port as an output port of the second packet based on inclusion of the second port in the second set of ports and based on the ranks of the plurality of previous output ports; and select the second port as the output port for the second packet based on the prediction.

2. The network switch of claim 1, wherein the routing module is further configured to:

rank each of the second set of ports according to a probability associated with each port in the second set of ports being the output port; and select the second port based on the ranks of the second set of ports.

3. A method to route packets, the method comprising:

outputting each of a plurality of first packets at one of a plurality of previous output ports of a plurality of ports of a network switch;

receiving, after output of the plurality of first packets, a second packet at a first port of the plurality of ports;

predicting, by the network switch, a first set of ports of the plurality of ports as potential output ports for the second packet based on the previous output ports of the plurality of first packets;

predicting, by the network switch, a second set of ports of the plurality of ports as incorrect output ports for the second packet by application of a Bloom filter to the plurality of ports;

excluding, by the network switch, the second set of ports from the first set of ports based on the prediction of the second set of ports as incorrect output ports; and selecting, by the network switch, a second port from the first set of ports as an output port for the second packet based on the predictions.

4. The method of claim 3, further comprising:

ranking, by the network switch, the ports in the first set of ports according to a probability associated with each port in the first set of ports being the output port; and selecting the second port based on the ranks of the ports in the first set of ports.

5. The method of claim 3, further comprising:

ranking, by the network switch, ports of the first set of ports based on a frequency of use of the ports of the first set of ports as previous output ports for the plurality of first packets; and selecting the second port based on the ranks of the ports of the first set of ports.

6. The method of claim 3, further comprising:

ranking, by the network switch, ports of the first set of ports based on how recently the ports the first set of ports were used as previous output ports for the plurality of first packets; and selecting the second port based on the ranks of the ports of the first set of ports.

7. The method of claim 3, further comprising:

predicting a third set of ports of the plurality of ports as incorrect output ports for the second packet based on the third set of ports being incorrect output ports for the plurality of first packets; and excluding, by the network switch, the third set of ports from the first set of ports based on the prediction of the third set of ports as incorrect output ports.

8. A network switch, comprising:

a plurality of ports including a first port that is configured to receive a packet; and a routing module coupled to the plurality of ports and configured to:

exclude a first set of ports of the plurality of ports from consideration as potential output ports for the packet based on application of a Bloom filter to the plurality of ports;

predict a second set of ports of the plurality of ports as potential output ports for the packet based on the second set of ports remaining for consideration as potential output ports for the packet after exclusion of the first set of ports; and select a second port from the second set of ports as an output port for the packet based on inclusion of the second port in the second set of ports and based on previous use of the second port as a previous output port for one or more previously received packets.

9. The network switch of claim 8, wherein the routing module is further configured to exclude the first set of ports from consideration as potential output ports for the packet based on one or more previous incorrect output ports of the one or more previously received packets.

10. The network switch of claim 8, wherein the routing module is further configured to:

predict the second port as a potential output port for the packet based on a probability that the second port is the output port; and select the second port based on the prediction.

11. The network switch of claim 8, wherein the routing module is further configured to:

predict the second port as a potential output port for the packet based on a frequency of use of the second port as the previous output port of the one or more previously received packets; and select the second port based on the prediction.

12. The network switch of claim 8, wherein the routing module is further configured to:

predict the second port as a potential output port for the packet based on how recently the second port was used as the previous output port of the one or more previously received packets; and select the second port based on the prediction.

13. A method to route packets, the method comprising:

receiving a packet at a first port of a plurality of ports of a network switch of a chip;

excluding a first set of ports of the plurality of ports from consideration as potential output ports for the packet based on application of a Bloom filter to the plurality of ports;

predicting a second set of ports of the plurality of ports as potential output ports for the packet based on the second set of ports remaining for consideration as potential output ports for the packet after exclusion of the first set of ports; and selecting a second port from the second set of ports as an output port for the packet based on inclusion of the second port in the second set of ports and based on previous use of the second port as a previous output port for one or more previously received packets.

14. The method of claim 13, further comprising:
excluding the first set of ports from consideration as output ports for the packet based on one or more previous incorrect output ports of the one or more previously received packets.

15. The method of claim 13, further comprising:
predicting the port as a potential output port for the packet based on a frequency of use of the second port as the previous output port of the one or more previously received packets; and
selecting the second port based on the prediction.

16. The method of claim 13, further comprising:
predicting the port as a potential output port for the packet based on how recently the second port was used as the previous output port of the previously received packets; and
selecting the second port based on the prediction.

17. An article of manufacture comprising:
a non-transitory computer-readable storage medium including computer-readable instructions stored thereon, which, in response to execution by a processor, cause the processor to perform or cause the processor to control performance of:
  outputting each of a plurality of first packets at one of a plurality of previous output ports of a plurality of ports of a network switch;
  receiving a second packet at a first port of the plurality of ports;
  ranking each of the plurality of previous output ports based on one or more of: a frequency of use of the previous output ports as output ports and how recently the previous output ports were used as output ports;
  predicting, by the network switch, a first set of ports of the plurality of ports as potential output ports for the second packet based on the ranking of the previous output ports;
  predicting, by the network switch, a second set of ports of the plurality of ports as being incorrect output ports for the second packet;
  excluding, by the network switch, the second set of ports from the first set of ports based on the prediction of the second set of ports as incorrect output ports; and
  selecting, by the network switch, a second port from the first set of ports as an output port of the packet based on the predictions.

18. The article of manufacture of claim 17, wherein the instructions further cause the processor to perform or further cause the processor to control performance of:
  predicting a third set of ports of the plurality of ports as being incorrect output ports for the second packet based on the third set of ports being incorrect output ports for the plurality of first packets; and
  excluding, by the network switch, the third set of ports from the first set of ports based on the prediction of the third set of ports as incorrect output ports.

* * * * *

UNITED STATES PATENT AND TRADEMARK OFFICE
CERTIFICATE OF CORRECTION

| | | |
|---|---|---|
| PATENT NO. | : 9,191,341 B2 | Page 1 of 1 |
| APPLICATION NO. | : 14/021940 | |
| DATED | : November 17, 2015 | |
| INVENTOR(S) | : Mangione-Smith | |

It is certified that error appears in the above-identified patent and that said Letters Patent is hereby corrected as shown below:

In the claims

In Column 13, Line 58, in Claim 6, delete "ports the" and insert -- ports of the --, therefor.

Signed and Sealed this
Eighth Day of March, 2016

Michelle K. Lee
*Director of the United States Patent and Trademark Office*